United States Patent [19]

Richards et al.

[11] 4,039,404

[45] Aug. 2, 1977

[54] CYCLIC PROCESS USING A.C. FOR SELECTIVE RECOVERY OF METALS FROM MATERIALS CONTAINING SAME

[75] Inventors: Kenneth Julian Richards, Salt Lake City; Don Richard Clark, Centerville, both of Utah

[73] Assignee: Kennecott Copper Corporation, New York, N.Y.

[21] Appl. No.: 684,950

[22] Filed: May 10, 1976

Related U.S. Application Data

[63] Continuation-in-part of Ser. No. 578,523, May 19, 1975, abandoned.

[51] Int. Cl.$^2$ ............... C25C 1/12; C22B 3/00; C22B 60/02; C22B 23/04
[52] U.S. Cl. ..................... 204/106; 204/108; 75/101 BE; 75/117; 75/119; 75/120; 75/121
[58] Field of Search .............. 204/106, 108, 186, 191, 204/302; 75/101 BE, 117, 119, 120, 121

[56] References Cited

U.S. PATENT DOCUMENTS

| 3,089,750 | 5/1963 | Samuelson et al. | 204/302 |
| 3,437,575 | 4/1969 | Gross et al. | 204/186 |
| 3,666,446 | 5/1972 | Cook et al. | 75/101 BE |
| 3,674,464 | 7/1972 | Chiola et al. | 75/101 BE |
| 3,676,106 | 7/1972 | Hazen | 75/101 BE |
| 3,773,635 | 11/1973 | Kane et al. | 204/105 M |

FOREIGN PATENT DOCUMENTS

| 1,224,950 | 3/1971 | United Kingdom | 204/186 |

*Primary Examiner*—R. L. Andrews
*Attorney, Agent, or Firm*—Mallinckrodt & Mallinckrodt

[57] ABSTRACT

A cyclic process for selective recovery of a metal from a material which contains other metal values in addition to the selected metal, comprises leaching the material with an aqueous solution capable of leaching metal values including the selected metal from the material. The resulting, aqueous solution, containing the selected metal and other metallic contaminants, is dispersed in an organic medium comprising an exchange reagent which is capable of selectively extracting the selected metal from the aqueous solution while rejecting any other metal values in the aqueous solution. The dispersion, comprising the aqueous solution and the organic medium containing the extracted metal, is passed as a flowing stream through a zone in which there are a plurality of spaced, parallel, elongate electrodes. Flow of the dispersion is such that it is distributed uniformly about the electrodes. An alternating current potential is applied to the electrodes to create an A.C. electrical field within the zone sufficient to electrically coalesce the aqueous phase of the flowing dispersion, and the aqueous phase is then separated from the organic phase in a separation zone downstream from the electrodes. The selected metal values are stripped from the organic phase by dispersing the organic phase in an aqueous stripping solution. This dispersion is then resolved into an organic phase and an aqueous phase by flowing the dispersion through a zone as is described above. The selected metal is recovered in essentially pure form from the aqueous phase, and the organic phase can be used in further selective extraction of metal values from aqueous leach solution.

17 Claims, 4 Drawing Figures

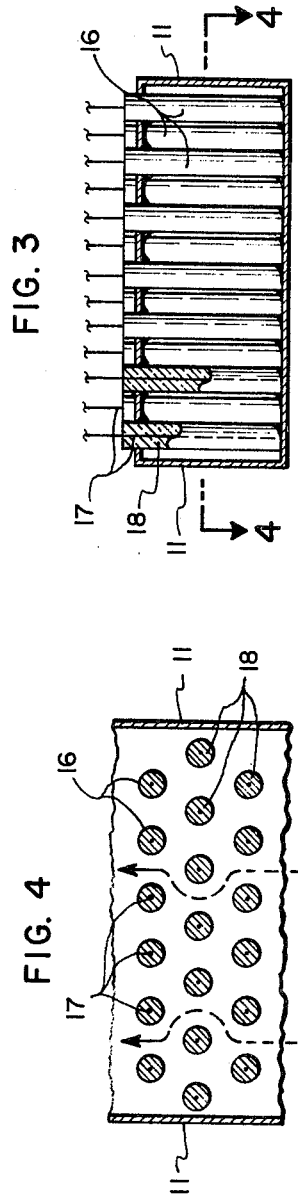
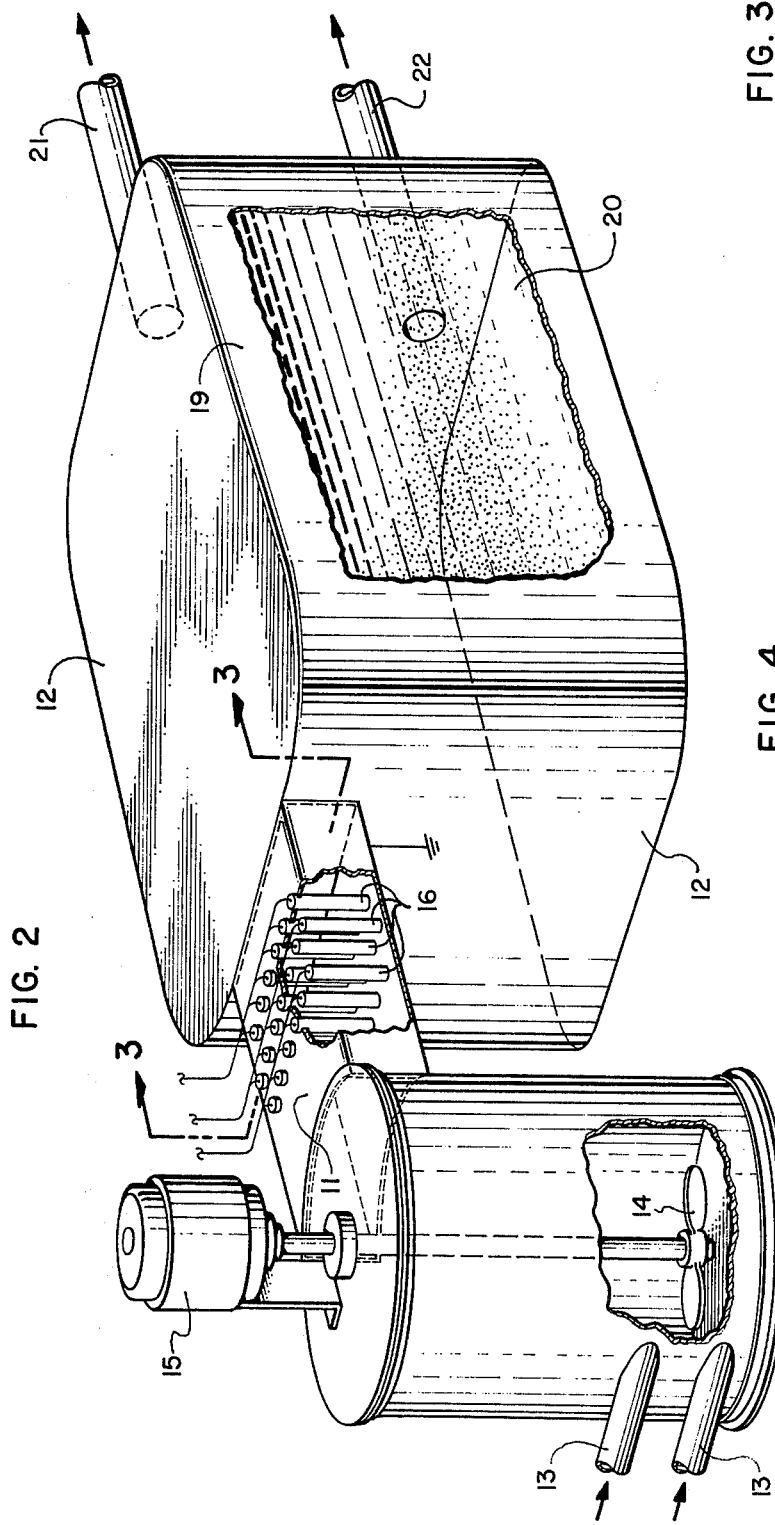

CYCLIC PROCESS USING A.C. FOR SELECTIVE RECOVERY OF METALS FROM MATERIALS CONTAINING SAME

RELATED APPLICATION

This application is a continuation-in-part of our co-pending application Ser. No. 578,523, filed May 19, 1975, now abandoned.

BACKGROUND OF THE INVENTION

1. Field

This invention relates to processes for selectively recovering a metal from a material containing other metal values in addition to the selected metal. In particular, the invention relates to integrated processes for selectively recovering a metal from a material containing such metal using selective, solvent extraction techniques.

2. State of the Art

Selective recovery of copper from aqueous solutions resulting from leaching copper-bearing minerals is well known. Organic, water-immiscible extracting agents are intimately contacted with the aqueous, copper-bearing solution resulting in a transfer of the copper values from the aqueous phase to the organic phase. The phases are allowed to separate in large settling tanks, and the copper recovered from the separated organic phase. The output of such processes has been limited by the size of the settling tanks, sufficient residency in the settling tanks being required to obtain satisfactory separation of the organic phase and the aqueous phase.

Applying a high-voltage electric field to an oil-water dispersion to coalesce water droplets has been used in the petroleum industry to remove small amounts of water from oil distillates and crude oil. Commercial application of electrical coalescence has generally been limited to dispersions containing only small amounts of water.

The electric field is customarily established by immersing a plurality of electrodes in the dispersion. As the water content of the dispersion increases, coalesced water particles have a tendency to form conducting bridges between the immersed electrodes. Several early patents (see, for example U.S. Pat. Nos. 1,116,299; 1,980,722; and 2,072,917) suggested utilizing alternating current or pulsating direct current to avoid the short circuiting of the electrodes caused by the formation of the conducting bridges. In U.S. Pat. No. 2,000,018, uni-directional, high voltage impulses, having durations of not greater than ten microseconds, with a time interval between impulses of at least 10 times the duraton of the impulse, were required to be effective in inhibiting the formation of the conducting bridges.

It has also been suggested (see U.S. Pat. Nos. 3,074,870 and 3,567,619) to use a corona wind discharge to prevent the formation of conducting bridges. The isolation of the electrodes from the solution eliminates the conducting bridges; however, the corona wind discharge has been found to be rather ineffective in coalescing the water particles in the dispersion.

Recent developments in the petroleum field and related arts have been directed to improved apparatus and processes for applying potentials of very high gradients to hydrocarbon dispersions which contain very small amounts of water. U.S. Pat. Nos. 3,616,460 and 3,701,723 disclose systems using coaxially arranged electrodes, with the dispersion flowing longitudinally through the interelectrode space. U.S. Pat. No. 3,661,746 discloses a system for flowing the dispersion along a vertical flow axis and through an electric field which increases monitonically in potential in the direction of dispersion flow.

In a United Kingdom Pat. No. 909,485, processes are disclosed wherein an aqueous phase and an organic phase are first intimately mixed with each other, the dispersion or mixture being subsequently separated into its respective phases in a gravity settling tank. Improved settling rates were obtained by producing a high voltage electric field in the settling tank in the region of the emulsion band separating the aqueous phase from the organic phase.

SUMMARY OF THE INVENTION

In accordance with the present invention, a cyclic process for selectively recovering a metal from a material which contains other metal values in addition to the selected metal is provided, wherein the aqueous leach solution obtained by leaching the material with an aqueous solution capable of leaching metal values including the selected metal from the material is intimately mixed with an organic solution which is capable of selectively extracting the selected metal from the aqueous leach solution. The mixture, comprising the aqueous phase dispersed in an organic continuum, is resolved into its separate phases by passing the dispersion through a zone in which there are a plurality of spaced, parallel, elongate electrodes to conalesce the phases, and thereafter allowing the phases to separate in a gravity separation zone downstream from the electrodes. The elongate electrodes are insulated electrically from walls defining the zone in which they are positioned, with the electrodes being situated so that the flow of dispersion through the zone is distributed uniformly thereabout. An alternating current potential is applied to the elongate electrodes to produce an electric field through which the dispersion passes. The potential applied to the electrodes is of sufficient voltage to produce an electric field which electrically coalesces the aqueous phase of the dispersion as the dispersion passes through the electric field. The voltage applied to each electrode can be in the range from about 250 volts to about 20,000. A major benefit of the invention is that voltage in the range of 250 to 7500 volts are essentially as effective as higher voltages in the range of 7500 to 20,000 volts. The coalesced aqueous phase is then separated from the organic phase in a gravity separation zone downstream from the electrodes.

The process of the invention can be applied to the selective solvent extraction of various metals, such as nickel, molybdenum, and copper from materials containing same. Aqueous, leach solutions are used to leach the selected metal values, together with other metal values therein, from such materials. The resulting, pregnant, leach solutions, containing dissolved metal values, are intimately contacted e.g., mixed, with an organic medium carrying an exchange reagent, which has a high affinity for the selected metal and a low affinity for other contaminating metals contained in the pregnant leach solution.

Such reagents as substituted benzophenone oxime, sold by General Mills under the trade name LIX 64N and LIX 65N are effective in selectively extracting copper values from acid sulfate and ammoniacal solutions. These reagents form chelates with the copper values and are generally known as chelating reagents.

Molybdenum, uranium and cobalt can be selectively extracted from acidic aqueous solutions using amine reagents such as those sold by Ashland Chemical Company under the tradename Adogen Amines. These reagents exchange anions and are known as anionic reagents. Acidic reagents, such as di-(2-ethylhexyl) phosphoric acid are effective in selectively extracting zinc and vanadium from acidic aqueous solutions. The metal values in the pregnant leach solution are exchanged for a cation or anion of the exchange reagent to form a complex which is not soluble in the aqueous phase but is soluble in the organic phase, thereby producing a dispersion comprising an aqueous phase containing exchanged cations or anions and an organic phase containing the exchange reagent and the metal complex thereof.

Organic solvents containg oxygen bonded to carbon, such as esters, ethers, alcohols, and ketones, and those containing oxygen bonded to phosphorus in alkylphosphoric esters, such as tributylphosphate, are capable of selectively extracting metals or metal complexes from aqueous solutions. These reagents are known as neutral of solvating reagents, and the selected metal values in the aqueous phase are dissolved into the organic phase, thereby providing a dispersion of the organic phase containing the selected metal and the aqueous phase which is depleted of the selected metal values.

Common to all systems, a dispersion is formed comprising an aqueous phase from which the selected metal values have been extracted and an organic phase containing the extracted metal values. This dispersion is then passed through a zone, having a plurality of spaced, parallel, elongate electrodes disposed and subjected to an electric field by applying an alternating current potential to the electrodes. The electrically-treated dispersion is then forwarded to a gravity settling tank, wherein the coalesced aqueous phase is separated by gravity from the organic phase which contains the metal-bearing, organic exchange reagent. The aqueous phase is recycled as leach solution for further leaching of the metal-bearing materials.

The organic phase containing the metal-bearing, exchange reagent is forwarded to a stripping stage, wherein it is intimately contacted with an aqueous stripping solution containing exchange ions which are capable of replacing the selected metal and regenerating the exchange reagent. The dispersion produced during the stripping comprises an aqueous portion containing exchanged ions of the selected metal and an organic portion containing the regenerated exchange reagent. This dispersion is passed through another zone in which there are a plurality of electrodes and subjected to an electrical field treatment in the same manner as hereinbefore described for treating the dispersion formed from the pregnant leach solution. The resulting electrically treated dispersion is forwarded to a gravity settling tank wherein the coalesced, aqueous, metal-bearing phase is separated from the organic phase which contains the exchange reagent. The organic phase is recycled as the reagent used to extract metal ions from the pregnant, aqueous, leach solution. The enriched, aqueous, solution containing the selected metal is an essentially impurity-free solution which can be further treated to recover the metal therefrom in essentially pure form.

The mixing, coalescing, and separation steps of the process are advantageously accomplished using mixer/coalescer/settler apparatus of the invention, which comprises a mixing chamber and means for continuously supplying an aqueous-organic dispersion thereto. The mixing chamber is connected with a settling tank by means of a flow passageway so that the dispersion being produced in the mixing chamber flows through the flow passageway and into the settling tank. A plurality of spaced, elongate electrodes are disposed in the conduit. The elongate electrodes are disposed so that the flowing dispersion stream is uniformly distributed thereabout. Insulating means protect the elongate electrodes from electrical contact with the material defining the passageway. The flow passageway is preferably made of an electrically conductive material, and is grounded. When an alternating current potential is applied to the elongate electrodes, an electric field is established between the elongate electrodes and the walls of the flow passageway. The potential applied to the electrodes is of sufficient voltage to produce an electric field which electrically coalesces the aqueous phase of the dispersion as it flows through the conduit. The coalesced aqueous phase separates from the organic phase in the settling tank.

The conduit can also be made from an electrically nonconducting material, such as plastic or glass. When a nonconducting conduit is employed, the A.C. potential is applied to the electrodes to create an electrical field between alternating elongate electrodes.

The apparatus is relatively simple, especially in view of the elaborate and complex equipment used heretofore in the oil industry for separating small quantities of water from oil, kerosene, and other gasoline fractions. The process and apparatus of this invention provide a substantial increase in the rate of coalescence of the dispersed aqueous phases of aqueous-organic dispersions which contain substantial amounts of water. As a result, the rate of phase separation in the settling tank is markedly increased, and the amount of dispersion which can be separated per minute per square foot of settling tank area is increased by a factor of 5 or more.

THE DRAWINGS

The best mode of carrying out the invention is illustrated in the accompanying drawings, in which:

FIG. 1 is a flowsheet showing the invention as applied in an integrated, cyclic process for extraction of copper from copper-bearing materials using solvent extraction techniques;

FIG. 2, a perspective view of mixer/coalescer/settler apparatus of the present invention, in which the conduit defining the passageway between the mixer and settler is partially borken away to show the elongate electrodes positioned therein;

FIG. 3, a vertical section taken along the line 3—3 of FIG. 2; and

FIG. 4, a fragmentary horizontal section taken along the line 4—4 of FIG. 3.

DETAILED DESCRIPTION OF ILLUSTRATED EMBODIMENT

Figure 1:
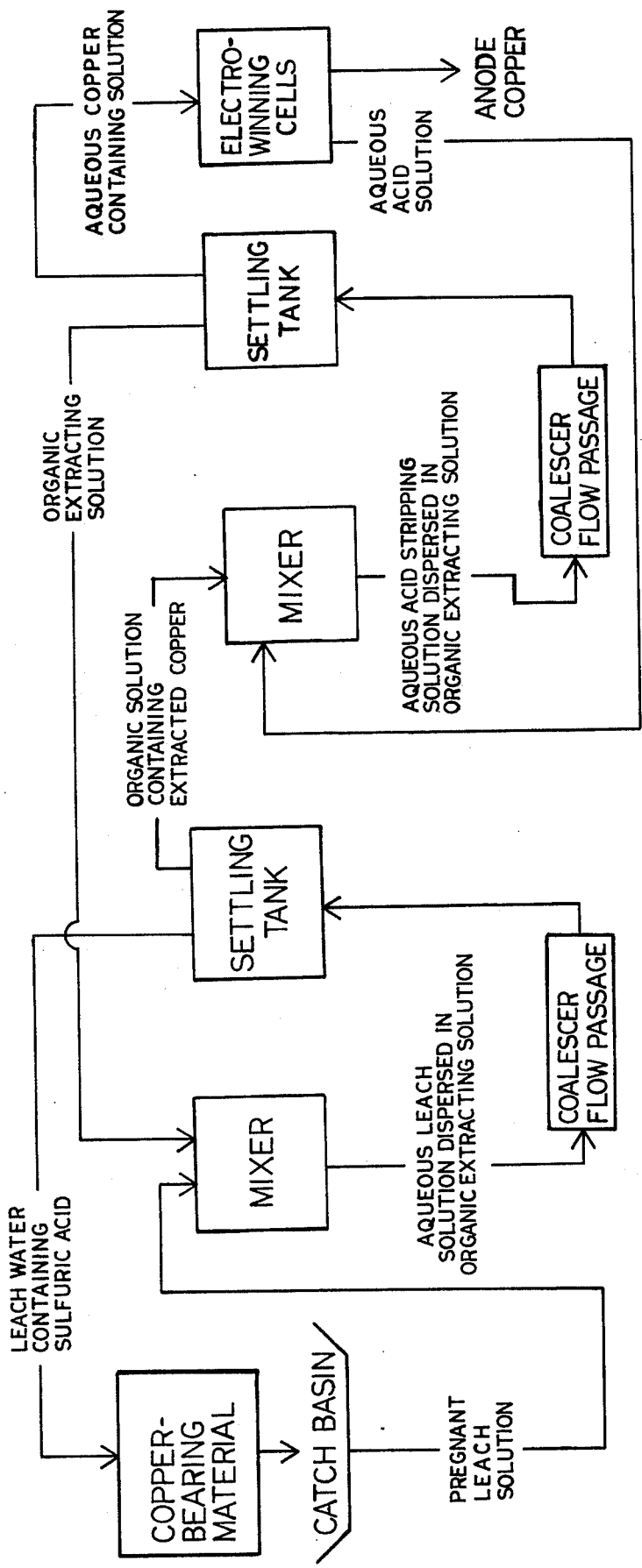

In accordance with the invention, the phases of an aqueous-organic dispersion are resolved by passing the dispersion through a zone having a plurality of spaced, parallel, elongate electrodes positioned therein so that the flow of dispersion is distributed uniformly about the electrodes. An alternating current potential is applied to each of the elongate electrodes, thereby establishing an electric field through which the dispersion passes. The potential is of sufficient voltage to create an electrical field which electrically coalesces the aqueous phase of the dispersion as it passes through the electric field. Voltages of between 250 and 20,000 volts have been found to be effective. However, it has been found that voltages far lower than 20,000 volts are just as effective in the present invention as are the high voltages. Thus, the preferred voltage applied to each of the elongate electrodes is in the range of from about 250 volts to 7500 volts.

The elongate electrodes are preferably disposed with their longitudinal axes generally transverse to the path of the flow of the dispersion. The zone in which the electrodes are positioned is preferably defined by a housing made of an electrically conductive material. The housing is grounded, and an A.C. potential is applied to create an A.C. electrical field between the elongate electrodes and the housing. If the housing is made of a nonconducting material the A.C. potential is applied to the elongate electrodes to create an A.C. electrical field between alternating electrodes. For simplicity, the electrodes are preferably positioned in rows which extend generally transversely across the path of flow of the dispersion. However, the rows of electrodes could just as well be positioned at an angle with respect to the path of flow of the dispersion. The rate of flow of the dispersion past the electrodes should be substantially uniform from electrode to electrode. Multiple rows of electrodes have been found to be advantageous, with the electrodes in the odd-numbered rows being staggered with respect to the electrodes in the even-numbered rows. Three or more rows of staggered electrodes are preferred. The inter-electrode spacing is not per se critical, and the optimum spacing for any specific set of circumstances can be easily determined by simple experimentation. Preferably, the external shape of the electrodes, including any insuating material covering the electrodes, is cylindrical; however, the cross-sectional shape of the electrodes is not critical.

The present invention is particularly adapted to be used in hydrometallurgical applications of solvent extraction wherein an aqueous solution such as a leach solution, containing selected metal values in addition to other metal values is intimately contacted with an organic solution comprising an exchange reagent capable of selectively extracting the selected metal values from the aqueous solution. In such operations, the aqueous portion of the dispersion which is formed is present in substantial amounts i.e. 10 percent or more by volume. Customarily, the aqueous portion is present in about equal proportions with the organic liquid.

The aqueous and organic solutions are preferably contacted in continuous fashion in a mixing device, and the resulting dispersion is withdrawn from the mixer as a continuous flowing stream. The dispersion is then passed through a zone in which a plurality of electrodes are disposed as hereinbefore described. The dispersion is subjected to an electric field by applying an alternating current potential to the electrodes, and the electrically-treated dispersion is delivered to a settler wherein the coalesced aqueous phase separates from the organic phase.

A flowsheet of an integrated, cyclic process for recovering high quality cathode copper from a copper-bearing material according to the present invention is shown in FIG. 1. The copper-bearing material, such as mine ore, ore concentrates, the waste dump of a mine, and scrap metals containing copper, is contacted with an aqueous, leach solution, e.g., a weakly acidic solution of sulfuric acid and ferric sulfate. The leach solution dissolves copper and other metallic materials, such as iron, from the material being leached, and the pregnant leach solution is collected in a catch basin.

The pregnant leach solution containing copper values and other contaminating metal ions is forwarded to a mixer wherein it is intimately mixed with and dispersed in an organic, liquid medium containing a cationic, hydrogen ion exchange reagent which has a high degree of affinity for copper ions and a low degree of affinity for the other contaminating metallic ions. Such a reagent is sold by General Mills under the designation LIX 64N. The copper ions are selectively transferred from the aqueous phase to the organic phase of the dispersion, and hydrogen ions are transferred from the organic phase to the aqueous phase.

The resulting dispersion is withdrawn from the mixer and is passed as a flowing stream through a coalescing zone defined by a passageway in which a plurality of spaced, parallel, elongate electrodes are positioned. The elongate electrodes are electrically isolated from the walls defining the passageway and disposed in the passageway so that the flow of dispersion is distributed uniformly about the electrodes. The dispersion is subjected to an electric field as it flows through the passageway. The electric field is established by applying an alternating current potential to each of the elongate electrodes in the passageway. The potential is of sufficient voltage to electrically coalesce the aqueous phase of the dispersion as the dispersion passes through the electric field. Preferably, the walls defining the passageway are made of an electrically conducting material and are grounded. The A.C. potential is then applied to the electrodes to create an electrical field between the electrodes and the conductive, grounded passageway. When the passageway is made of a nonconductive material the A.C. potential is applied to the electrodes to create an A.C. electrical field between alternating elongate electrodes.

The electrically-treated dispersion flowing from the passageway is introduced into a gravity settling tank, wherein the coalesced aqueous phase is separated from the organic phase, which contains the copper-bearing, cationic exchange reagent. The aqueous phase is recycled as leach solution for further leaching of copper-bearing materials in the leach step.

The organic phase, containing the copper-bearing cationic exchange reagent is forwarded to a second mixer wherein it is intimately mixed with an aqueous, acidic, stripping solution to form a dispersion of the aqueous solution in the organic continuum. The aqueous solution strips copper from the cationic exchange reagent by exchanging hydrogen ions from the acidic, aqueous solution with copper ions from the cationic exchange reagent. The resulting dispersion comprises an aqueous phase containing exchanged copper ions and an organic phase containing the hydrogen form of the cationic exchange reagent.

A dispersion is withdrawn from the second mixer and is passed as a flowing stream through a second coalescing zone which is of the same construction as the first mentioned coalescing zone described hereinbefore. The flow of dispersion is subjected to an electric field in a manner similar to that described hereinbefore. The electrically treated dispersion, flowing from the second coalescing zone, is fed to a second gravity settling tank wherein the coalesced, copper-bearing, aqueous phase separates from the organic phase, which contains the hydrogen form of the caionic ion exchange reagent.

The organic phase is withdrawn from the second settling tank and is recycled as the organic medium to be mixed with the pregnant leach solution coming from the catch basin. The impurity-free, copper-bearing aqueous phase is further treated to recover the copper values therefrom. As shown, the aqueous solution can be subjected to electrolysis whereby high quality cathode copper and an acidic aqueous solution are produced. The acidic aqueous solution is advantageously recycled for use as the stripping solution in the second mixer.

Electrical coalescer apparatus according to the present invention is shown in FIGS. 2-4. The apparatus comprises, in combination, a mixing chamber 10, a flow passageway 11, and a settling tank 12. The passageway 11 interconnects the mixing chamber 10 with the settling tank 12.

The mixing chamber 10 is adapted to intimately mix an aqueous liquid and an organic liquid to produce a dispersion of the aqueous phase in the organic continuum. The organic and aqueous liquids are introduced continuously into the mixing chamber 10 through inlet pipes 13. The mixing chamber is equipped with means such as the mixing impeller 14 and drive motor 15, for mixing the organic and aqueous liquids to continuously form a dispersion thereof.

The aqueous-organic dispersion is withdrawn continuously from the top of the mixing chamber 10 and flows through the passageway 11 to the settling tank 12. The passageway 11 is defined by an electrically-conductive flow passageway which connects the top of the mixing chamber 10 to the top of settling tank 12. A plurality of spaced, elongate electrodes 16 are supported in the passageway 11 in electrical isolation therefrom. As shown, the electrodes 16 comprise an electrically conductive probe 17 encapsulated by an electrical insulating material 18 with the probe 17 extending from the top end of the encapsulating material (see FIGS. 3 and 4). The electrodes 16 are inserted into the passageway 11, through openings therein so that the insulating material 18 contacts and seals the openings in the passageway 11. The electrodes 16 are disposed in passageway 1 so that the flow of dispersion therethrough is uniformly distributed about the electrodes 16. Means are provided for applying an alternating current potential to the ends of probes 17 and for grounding the conductive passageway 11. The potential applied to the probes 17 is of sufficient voltage to electrically coalesce the aqueous phase of the dispersion as the dispersion flows through passageway 11.

The electrically coalesced dispersion flows into the settling tank 12, wherein the coalesced aqueous phase 19 separates from the organic phase 20 under the influence of gravity. The organic phase is withdrawn from the settling tank 12 through an outlet pipe 21 located near the top of tank 12, and the aqueous phase is withdrawn through an outlet pipe 22 located near the bottom of tank 12. Of course, if the organic phase has a density greater than that of water, the organic phase would settle to the bottom of tank 12, and would be withdrawn through outlet pipe 22. In such case, the aqueous phase would be withdrawn from the settling tank through outlet pipe 21.

As is shown in FIGS. 2-4, the electrodes 16 are preferably disposed in passageway 11 with their longitudinal axes being generally transverse to the flow of dispersion in passageway 11. However, the electrodes could just as well be positioned with their axes at an angle to the path of flow of dispersion. The electrodes 16 are shown as extending from the top of the flow passageway 11 to the bottom thereof; however, they could just as well extend from one side of the flow passageway 11 to the other side thereof.

The electrodes are also preferably positioned in rows which extend generally transversely across the path of flow of the dispersion. However, the rows of electrodes can be positioned at an angle with respect to the path of flow of the dispersion. The electrodes 16 are preferably positioned in three or more rows with the electrodes in the odd-numbered rows being staggered with respect to the electrodes in the even-numbered rows. The electrodes 16 can have any cross-sectional shape, but the cylindrical shape shown in the drawings is preferred. The electrodes can be spaced apart at any desirable distance.

The passageway 11 could just as well be made of a nonconductive material, in which case, the A.C. potential is applied to the elongate electrodes to create an A.C. electrical field between alternating electrodes.

The invention will further be described with reference to the following examples:

EXAMPLE 1

An aqueous, leach solution containing dissolved copper values was obtained from a commercial operation for leaching copper values from the waste dumps of a copper mine with an aqueous acidic leach solution. The copper-bearing leach solution was dispersed in an equal volume of an organic liquid (made by dissolving in kerosene an extractant marketed by General Mills under the trade name LIX 64N) in a mixing tank. The so formed dispersion was continuously withdrawn from the mixing tank and passed as a flowing stream through a passageway to a gravity settling tank. The dispersion separated into its aqueous and organic phases, and the two phases were withdrawn separately from the settling tank so as to maintain steady state conditions therein. The aqueous and organic phases withdrawn from the settling tank were returned to the mixer. The apparatus was essentially similar to that shown in FIG. 2 with the exception that there were no electrodes positioned in the passageway 11.

The capacity i.e., throughput, of the settling tank was found to be approximately two gallons per minute per square foot of horizontal cross-section of the settling tank.

EXAMPLE 2

The procedure of Example 1 was repeated with the exception that several separate modifications were made to the passageway connecting the mixing tank and the settling tank, so that the dispersion flowing through the passageway was subjected to an electric field.

One modification consisted of wrapping an electrical coil around the passageway. The electrical field produced by the coil, when a potential of 7000 volts was connected thereto, improved the coalescence of the aqueous phase, and the capacity of the settling tank was increased to approximately 7 gallons per minute per square foot.

A second modification consisted of positioning a series of insulated, plate electrodes in the passageway. Each electrode consisted of a copper conductor sealed between two pieces of plastic, thus insulating the electrode from the flow of dispersion in the passageway. Alternating plates were connected to an electrical potential and the remaining plates were grounded. The plates were positioned in longitudinal alignment with the path of flow of dispersion in the passageway, and the plates were equally spaced from each other and the sides of the passageway so that the flow of dispersion was distributed uniformly about the plates. When a potential of 7000 volts was connected to the alternating plates, the coalescence of the aqueous phase was improved and the capacity of the settling tank was increased to approximately 8 gallons per minute per square foot.

Another modification consisted of positioning three rows of insulated electrodes in the passageway. The electrode configuration was essentially the same as that shown in FIGS. 2-4. The electrodes comprised plastic dowels i.e., tubes, which were inserted through openings in the top of the passageway. The dowels fit tightly in the holes so as to form a seal, and an electrically conductive wire was positioned coaxially inside each dowel. Results obtained with this modification were superior to the results obtained with either of the first two modifications. The coalescence of the aqueous phase was markedly increased with a decrease in potential being applied to the electrodes. When 4000 volts, alternating current potential was applied to the electrodes positioned within the dowels, with the passageway being grounded, the capacity of the settling vessel was increased to 10 gallons per minute per square foot.

It was found that direct current has no coalescing effect on the dispersion and that alternating current must be applied to the electrodes to create an A..C. electrical field between the electrodes and the grounded conduit, or, when a nongrounded or nonconducting conduit is employed, to create an A.C. electrical field between alternating, elongate electrodes.

EXAMPLE 3

The procedure of Example 1 was repeated with the exception that a stainless steel screen was positioned in the passageway connecting the mixing tank and the settling tank, and the passageway was made of non-conductive material. Means were provided for applying various A.C. potentials to the screen so that the dispersion flowing through the passageway could be subjected to either no electric field or fields produced by the various potentials.

The dispersion produced in the mixer and flowing through the passageway comprised about 1.19 parts organic to 1 part aqueous. The dispersion was made by mixing an aqueous solution originally containing about 0.3 grams per liter of Cu from $CuSO_4 \cdot 5H_2O$ at a pH of about 2 with an organic solution comprising 10% by volume of an extractant marketed by General Mills under the trade name LIX 64N dissolved in an organic solvent marketed by Kerr-McGee under the trade name Napoleum 470.

With no potential applied to the screen, the capacity of the settling tank was about 2 gallons per minute per square foot of horizontal cross-section of the settling tank. When an A.C. potential of about 500 volts was applied to the screen, the capacity of the settling tank was increased to above 6 gallons per minute per square foot. In both instances, copper was effectively extracted from the aqueous phase by the organic phase.

EXAMPLE 4

The procedure of Example 3 was repeated with the exception that the aqueous portion of the dispersion originally contained about 2 grams per liter of nickel from nickel chloride, 9.25 grams per liter $(NH_4)_2CO_3 \cdot H_2O$, and 6 grams per liter $NH_4OH$, and had a pH of about 9.75.

With no potential applied to the screen, the capacity of the settling tank was about 2 gallons per minute per square foot of horizontal cross-section of the settling tank. With a A.C. potential of about 3500 volts applied to the screen, the capacity of the settling tank was increased to about 8 gallons per minute per square foot. In both instances, nickel was effectively extracted from the aqueous phase by the organic phase.

EXAMPLE 5

The procedure of Example 3 was repeated with the exception that the dispersion was made by mixing an aqueous solution containing 0.5 grams per liter of molybdenum in the form of ammonium molybdate at a pH of about 1 with a organic solution comprising 5% by volume of an extractant marketed by Ashland Chemicals under the trade name Adogen 381, 90% by volume Napoleum 470, and 5% by volume tri-decyl alcohol. Adogen 381 is an anionic type extracting reagent comprising tri-isooctyl amine. The ratio by volume of organic to aqueous in the dispersion was about 1.19.

With no potential applied to the screen, the capacity of the settling tank was less than 2 gallons per minute per square foot of horizontal cross-section of the settling tank. With an A.C. potential of 2,500 volts applied to the screen, the capacity of the settling tank was increased to above 6 gallons per minute per square foot. In both instances, molybdenum was effectively extracted from the aqueous phase by the organic phase.

EXAMPLE 6

The process of Example 3 was repeated with the exception that the dispersion was made by mixing an aqueous solution containing 0.1 grams per liter of uranium from $U_3O_8$ at a pH of about 1.5 with an organic solution comprising 5% by volume of the extractant Adogen 381, 5% by volume tri-decyl alcohol, and 90% by volume Napoleum 470. The ratio by volume of organic to aqueous in the dispersion was about 1.19.

With no potential applied to the screen, the capacity of the settling tank was less than 2 gallons per minute per square foot of horizontal cross-section of the settling tank. With an A.C. potential of 2500 volts applied to the screen, the capacity of the settling tank was increased to above 6 gallons per minute per square foot. In both instances, the uranium was effectively extracted from the aqueous phase by the organic phase.

EXAMPLE 7

The process of Example 3 was repeated with the exception that the dispersion was made by mixing an aqueous solution containing 1 gram per liter of zinc from $ZnSO_4$ at a pH of about 3 with an organic solution comprising 5% by volume of the extractant di-(2-ethylhexyl) phosphoric acid and 95% by volume Napoleum 470. The ratio by volume of organic to aqueous in the dispersion was about 1.19.

With no potential applied to the screen, the capacity of the settling tank was about 2 gallons per minute per square foot of horizontal cross-section of the settling tank. With an A.C. potential of about 2,000 volts applied to the screen, the capacity of the settling tank was increased to above 8 gallons per minute per square foot. In both instances the zinc was effectively extracted from the aqueous phase by the organic phase.

EXAMPLE 8

The process of Example 3 was repeated with the exception that the dispersion was made by mixing an aqueous solution containing 1 gram per liter of vanadium from $V_2O_5$ at a pH of about 1.15 with an organic solution comprising 13% by volume of the extractant di-(2-ethylhexyl) phosphoric acid and 87% by volume Napoleum 470. The ratio by volume of organic to aqueous in the dispersion was about 1.19.

With no potential applied to the screen, the capacity of the settling tank was about 2 gallons per minute per square foot of horizontal cross-section of the settling tank. With an A.C. potential of about 2,000 volts applied to the screen, the capacity of the settling tank was increased to above 6 gallons per minute per square foot. In both instances the vanadium was effectively extracted from the aqueous phase by the organic phase.

EXAMPLE 9

The process of Example 3 was repeated with the exception that the dispersion was made by mixing an aqueous solution containing 0.1 gram per liter of uranium from $UO_2(NO_3)_2 \cdot 6H_2O$ at a pH less than 0 with an organic solution comprising 50% by volume of the extractant tributylphosphate and 50% by volume Napoleum 470. The ratio by volume of organic to aqueous in the dispersion was about 1.19.

With no potential applied to the screen, the capacity of the settling tank was about 2 gallons per minute per square foot of horizontal cross-section of the settling tank. With an A.C. potential of about 2,000 volts applied to the screen, the capacity of the settling tank was increased to above 6 gallons per minute per square foot. In both instances the uranium was effectively extracted from the aqueous phase by the organic phase.

EXAMPLE 10

The process of Example 3 was repeated with the exception that the dispersion was made by mixing an aqueous solution containing 1 gram per liter of cobalt from $CoCl_2 \cdot 6H_2O$, 275 grams per liter NaCl and having a pH of 5.65 with an organic solution comprising 5% by volume of tri $C_8-C_{10}$ amine, 5% by volume tri-decyl alcohol, and 90% by volume Napoleum 470. The ratio by volume of organic to aqueous in the dispersion was about 1.19.

With no potential applied to the screen, the capacity of the settling tank was about 2 gallons per minute per square foot of horizontal cross-section of the settling tank. With an A.C. potential of about 2000 volts applied to the screen, the capacity of the settling tank was increased to above 6 gallons per minute per square foot. In both instances the cobalt was effectively extracted from the aqueous phase by the organic phase.

EXAMPLE 11

The process of Example 3 was repeated with the exception that the disperson was made by mixing an aqeuous solution containing 1.84 grams per liter nickel from nickel sulfate and having a pH of 1.83 with an organic solution comprising 10% by volume LIX-63 (marketed by General Mills), 10% by volume di-(2-ethylhexyl) phosphoric acid, and 80% by volume Napoleum 470. The ratio by volume of organic to aqueous in the dispersion was about 1.19.

With no potential applied to the screen, the capacity of the settling tank was about 2 gallons per minute per square foot of horizontal cross-section of the settling tank. With an A.C. potential of about 500 volts applied to the screen, the capacity of the settling tank was increased to above 6 gallons per minute per square foot. In both instances the nickel was effectively extracted from the aqueous phase by the organic phase.

In general, uranium and molybdenum can be extracted from aqueous acidic leach solutions with anionic exchange reagents selected from the group consisting of primary amines, secondary amines, tertiary amines, and quaternary ammonium salts. The extracted metals can then be stripped from the loaded organic exchange reagent with aqueous salt solutions, aqueous base solutions, aqueous acidic salt solutions, and aqueous basic salt solutions.

Copper can be extracted from aqueous acidic leach solutions with chelating type exchange reagents (also called cationic, hydrogen ion exchange reagents) selected from the group consisting of hydroxyquinoline, alpha-hydroxyoximes, and ethylenediaminetetraacetic acid. The extracted copper can then be stripped from the loaded organic exchange reagent with aqueous acid solutions. Copper can also be extracted from aqueous, ammoniacal solutions using the same exchange reagents. The extracted copper is stripped from the loaded organic exchange reagent with a acidic aqueous solution.

Uranium can also be extracted from acidic, aqueous solutions with acidic type exchange reagents selected from the group consisting of naphthenic acids, versatic acids, and di-(2-ethylhexyl) phosphoric acid. The extracted uranium can then be stripped from the loaded organic exchange reagent with aqueous acid solutions. Uranium can also be extracted from acidic, aqueous leach solutions using tributylphosphate as the exchange reagent. The extracted uranium is then stripped from the loaded exchange reagent with an aqueous acid solution or water.

Nickel can be extracted from basic leach solutions with the chelating type exchange reagents listed hereinabove. The extracted nickel can then be stripped from the loaded organic exchange reagent with aqueous acidic solutions.

Zinc and vanadium can be extracted from acidic leach solutions with the acidic type exchange reagents listed hereinabove. These metals can then be stripped from the loaded organic exchange reagents with aqueous acidic solutions.

Cobalt can be extracted from acidic leach solutions with anionic exchange reagents selected from the group consisting of primary amines, secondary amines, tertiary amines, and quaternary ammonium salts. The extracted cobalt can then be stripped from the loaded organic exchange reagent with aqueous salt solutions, aqueous base solutions, aqueous acidic salt solutions, and aqueous basic solutions.

Nickel can be extracted from acidic leach solutions with an exchange reagent comprising a mixture of a chelating type reagent and an acidic type reagent. The extracted nickel can then be stripped from the loaded organic exchange reagent with aqueous acidic solutions.

Whereas this invention is described and illustrated with reference to specific, presently preferred embodiments thereof, it should be realized that various changes may be made therein and other specific forms may be constructed by those skilled in the art without departing from the inventive concepts here disclosed.

We claim:

1. A cyclic process for selectively recovering metals from a material containing other metallic values in addition to the selected metal, comprising (a) leaching said material with an aqueous leach solution; (b) recovering a pregnant, aqueous, leach solution containing the selected metal and other metallic contaminants dissolved therein; (c) intimately mixing the recovered aqueous leach solution with an organic medium containing an exchange reagent, which is capable of selectively extracting the selected metal from the aqueous solution, thereby producing a dispersion comprising an aqueous portion containing said other metallic and exchanged ions, and an organic portion containing the exchange reagent and the selected metal values; (d) passing the dispersion from step (c) through a flow way having a plurality of spaced, parallel, elongate electrodes disposed therein so that the flow of dispersion in the flow way is distributed uniformly about the elongate electrodes; (e) subjecting the flow of dispersion in step (d) to an A.C. electric field by applying an A.C. potential to the elongate electrodes in the flow way, said field being sufficient to electrically coalesce the aqueous phase of the dispersion as it flows through said flow way; (f) feeding the electrically treated dispersion from step (e) to a gravity settling tank wherein the coalesced aqueous phase is separated from the organic phase; (g) recycling the aqueoue phase as leach solution for further leaching of said material; (h) intimately mixing the organic phase from step (f) with an aqueous stripping solution which is capable of stripping the selected metal ions from the organic phase, thereby producing a second dispersion comprising an aqueous portion containing the selected metal and an organic portion containing the exchange reagent; (i) passing the dispersion from step (h) through a second flow way having a plurality of spaced, parallel elongate electrodes disposed therein so that the flow of dispersion in said second flow way is distributed uniformly about the elongate electrodes; (j) subjecting the flow of dispersion in step (i) to an A.C. electric field by applying an A.C. potential to the electrodes in said second flow way, said field being sufficient to electrically coalesce the aqueous phase of the dispersion as it flows through second flow way; (k) feeding the electrically treated dispersion from step (j) to a gravity settling tank wherein the cooalesced, aqueous phase which contains the selected metal values is separated from the organic phase which contains the exchange reagent; (1) recycling the organic phase from step (k) as the organic medium containing an exchange reagent to be mixed with further leach solution in step (c); and (m) recovering the selected metal values from the aqueous phase obtained in step (k).

2. A process in accordance with claim 1, wherein said elongate electrodes are disposed with their longitudinal axes being generally transverse to the flow of said dipsersion.

3. A process in accordance with claim 2, wherein said elongate electrodes are disposed in rows thereof extending generally transversely across the path of flow of said dispersion.

4. A process in accordance with claim 3, wherein there are at least three rows of electrodes with the electrodes in the odd-numbered rows being staggered with respect to the electrodes in the even-numbered rows.

5. A process in accordance with claim 3, wherein said electrodes are cylindrical in shape, and the voltage applied thereto is in the range of from about 250 volts to 7000 volts, 6. A process in accordance with claim 1, wherein selected metal is selected from the group consisting of uranium, molybdenum, and cobalt, the leach solution which is mixed with the exchange reagent has an acidic pH, the exchange reagent is an anionic exchange reagent, and the stripping solution is one selected from the group consisting of aqueous salt solutions, aqueous base solutions, aqueous acidic salt solutions, and aqueous basic salt solutions.

7. A process in accordance with claim 2, wherein the aqueous salt solution is a solution of sodium chloride, the aqueous base solution is an ammonia or ammonium hydroxide solution, the acidic salt solution is suluric acid and sodium chloride, and the basic salt solution is ammonia or ammonium hydroxide and ammonium chloride.

8. A process in accordance with claim 1, wherein the selected metal is copper, the leach solution which is mixed with the exchange reagent has an acidic pH, the exchange reagent is selected from the group consisting of hydroxyquinoline, alpha-hydroxyoximes, and ethylenediaminetetraacetic acid, and the stripping solution is an aqueous acid solution.

9. A process in accordance with claim 8, wherein the copper values are recovered from the aqueous phase obtained in step (k) by passing an electrical current through said aqueous solution to deposit the copper values as high quality cathode copper and produce an acidic aqueous solution which is recycled for use as acid stripping solution in step (h).

10. A process in accordance with claim 1, wherein the selected metal is copper, the leach solution which is mixed with the exchange reagent has a basic pH, the exchange reagent selected from the group consisting of hydroxyquinoline and alpha-hydroxyoximes, and the stripping solution is an aqueous acid solution.

11. A process in accordance with claim 1, wherein the selected metal is uranium, the leach solution which is mixed with the exchange reagent has an acidic pH, the exchange reagent is selected from the group consisting of naphthenic acids, versatic acids, and di-(2-ethylhexyl) phosphoric acid, and the stripping solution is an aqueous acid solution.

12. A process in accordance with claim 1, wherein the selected metal is nickel, the leach solution is mixed with the exchange reagent has a basic pH, the exchange reagent is selected from the group consisting of hydroxyquinoline and alpha-hydroxyoximes, and the stripping agent is an acidic aqueous solution.

13. A process in accordance with claim 1, wherein the selected metal is nickel, the leach solution which is mixed with the exchange reagent has a acid pH, the exchange reagent is a mixture comprising a member selected from the group consisting of hydroxyquinoline and alpha-hydroxyoximes, and a member selective from the groud consisting of naphthenic acids, versatic acids, and di-(2-ethylhexyl) phosphoric acid, and the stripping agent is an acidic aqueous solution.

14. A process in accordance with claim 1, wherein the selected metal is uranium, the leach solution which is mixed with the exchange reagent has an acidic pH, the exchange reagent is tributylphosphate, and the stripping solution is an aqueous acid solution or water.

15. A process in accordance with claim 1, wherein the selected metal is selected from the group consisting of zinc and vanadium, the pH of the leach solution which is mixed with the exchange reagent is acidic, the exchange reagent is selected from the group consisting of naphthenic acids, versatic acids, and di-(2-ethylhexyl) phosphoric acid, and the stripping solution is an aqueous acid solution.

16. A process in accordance with claim 1, wherein the selected metal is cobalt, the leach solution which is mixed with the exchange reagent has an acidic pH, the exchange reagent is an anionic exchange reagent, and the stripping solution is one selected from the group consisting of aqueous salt solutions, aqueous base solutions, aqueous acidic salt solutions, and aqueous basic salt solutions.

17. A process in accordance with claim 1, wherein the A.C. voltage applied is in the range of from about 250 volts to 20,000 volts.

* * * * *